W. C. PRITCHARD.
COMBINED GRINDING AND CLEANING MILL.
APPLICATION FILED JUNE 17, 1911.
1,049,395.
Patented Jan. 7, 1913.
3 SHEETS—SHEET 1.
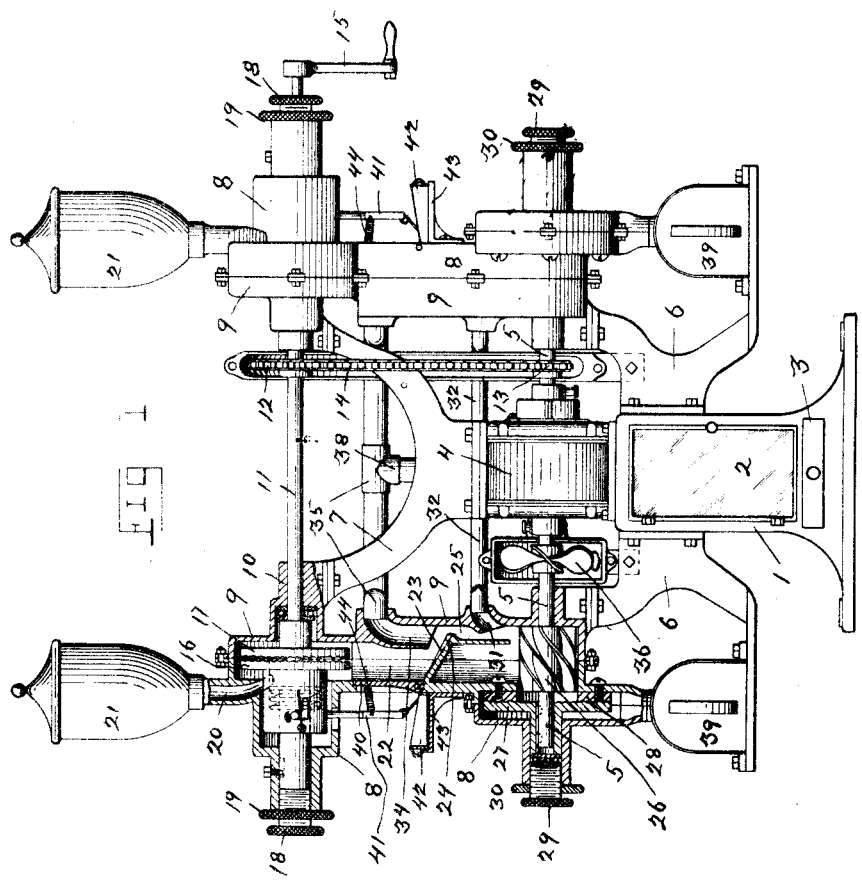
WITNESSES
INVENTOR
William C. Pritchard
BY
ATTORNEY

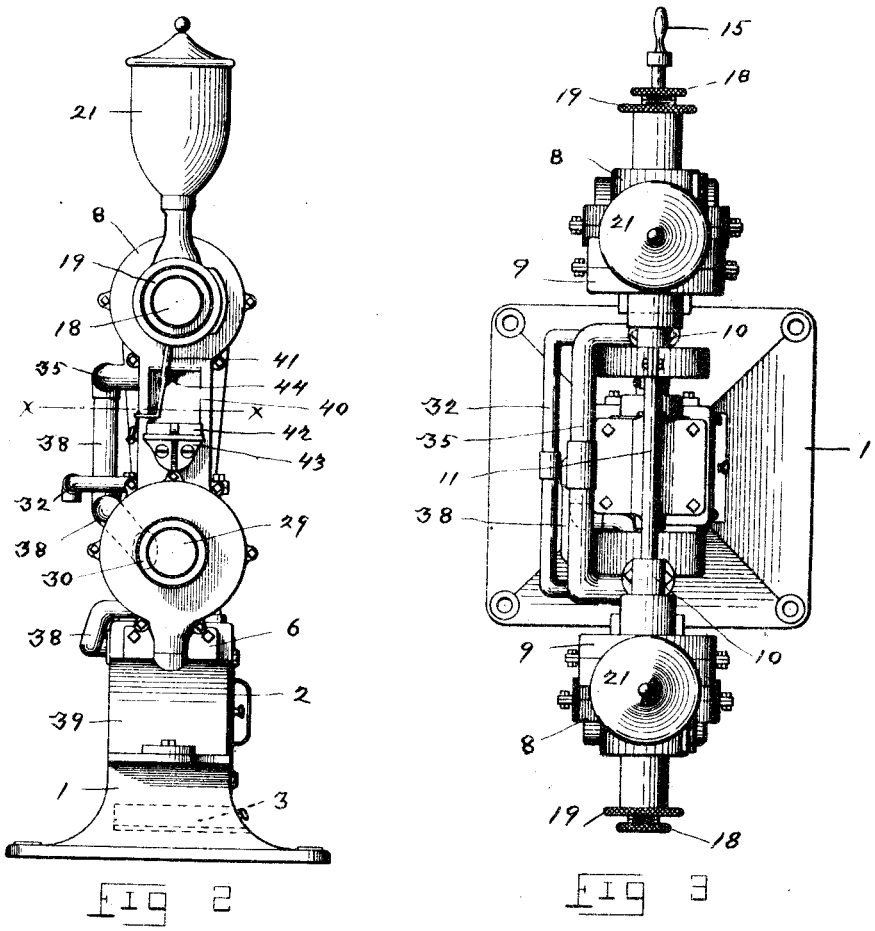

W. C. PRITCHARD.
COMBINED GRINDING AND CLEANING MILL.
APPLICATION FILED JUNE 17, 1911.
1,049,395.
Patented Jan. 7, 1913.
3 SHEETS—SHEET 3.
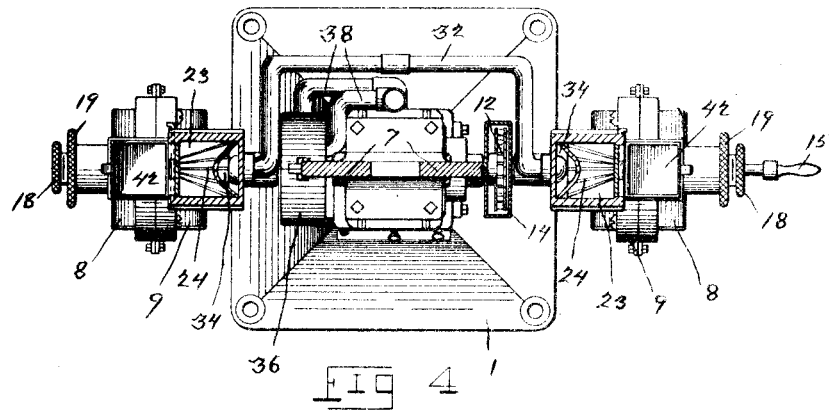
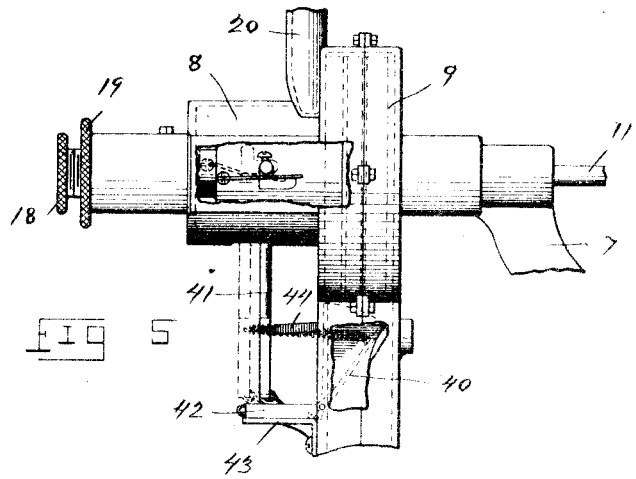
WITNESSES
INVENTOR
William C. Pritchard,
BY
ATTORNEY

UNITED STATES PATENT OFFICE.

WILLIAM C. PRITCHARD, OF LANCASTER, PENNSYLVANIA.

COMBINED GRINDING AND CLEANING MILL.

1,049,395.   Specification of Letters Patent.   Patented Jan. 7, 1913.

Application filed June 17, 1911. Serial No. 633,688.

*To all whom it may concern:*

Be it known that I, WILLIAM C. PRITCHARD, a citizen of the United States, residing at Lancaster, in the county of Lancaster and State of Pennsylvania, have invented certain new and useful Improvements in Combined Grinding and Cleaning Mills, of which the following is a specification, reference being had therein to the accompanying drawing.

This invention relates to a combined grinding and cleaning mill adapted for grinding grain and relating more particularly to the grinding and cleaning of coffee.

In the grinding of coffee there is a certain chaff that is loosened when the coffee berry is first broken into a few parts and which, if allowed to remain until the berry becomes entirely ground to the proper fineness for use, cannot then be removed without carrying a quantity of the ground coffee with it.

The object of the invention is to construct a mill of the double grinding type, that is, a mill having a crushing set of burs and a grinding set of burs, the object being to separate the chaff, dust and dirt from the coffee berry after it has passed through the grinding or crushing burs, and before it enters the grinding of fine burs. To accomplish this and other objects, I have provided novel mechanism which is simple, durable and cheap, being both easy of adjustment and effectual.

While I am aware that there are combined cleaners and grinders where it is intended to eliminate the chaff and dirt from the partly ground coffee by suction, it is impossible to accomplish the desired result in this manner, as all of the foreign matter can not be sucked from a solid stream of partly ground coffee; and it is therefore essential that the stream of coffee be broken up into a thin flow and passed over a broad surface, and the foreign matter, such as chaff, dirt, etc., be separated by a blast of air directed through said flow in a direction opposite to the same.

With these and other objects in view, my invention consists in certain construction and combination of parts as will hereinafter be described and claimed in the annexed specification and illustrated in the accompanying drawings which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a side elevation of a grinding mill for coffee, shown partly in section and embodying my invention. Fig. 2, is an end elevation of the same. Fig. 3, is a top plan view of the same. Fig. 4, is a sectional view taken on the line X—X of Fig. 2. Fig. 5, is a fragmentary view of the automatic bur releasing mechanism with parts of the casing cut away to expose the parts.

Referring to the drawings; a hollow base is indicated by 1, which is provided with a glass door 2, and a dirt collecting drawer 3. Upon the base 1, is mounted a motor 4, provided with a driving shaft 5, extending from both ends thereof.

Supported upon the brackets 6, which are secured to the base 1, and by the bracket 7, which is secured to the top of the motor 4, are the general frame and casing which are in two parts 8, and 9. The upper part of the frame 9, is formed with the bearings 10, within which is rotatably mounted the counter-shaft 11, which is either driven by the sprockets 12, and 13, and the chain 14, from the motor shaft 5, or by the hand crank 15; the motor 4, thus running idle and acting as a balance wheel. Upon the ends of said counter-shaft 11, are mounted the crushing burs 16, and 17, which are adjustable by the screw 18, and lock-nut 19, and which are also provided with automatic releasing mechanism which forms the subject of the Patent Number 1,011,243, issued December 12, 1911. Said crushing burs 16, and 17, are fed by a feed pipe or passage 20, from a hopper 21, supported by the casing 8, and the crushed grain or coffee berries pass from between the burs 16, and 17, into a discharge passage 22, which is provided with a fan-shaped inclined deflector plate 23, provided with diverging ribs 24, which separates and divides up the stream of coffee into a thin flow or layer which passes over the lower edge into a narrow passage 25, and is delivered upon a conveyer 26, mounted on and rotated by the motor shaft 5, and which carries the coffee to a set of grinding burs 27, and 28, mounted on said motor shaft 5, and provided with adjustment screw 29, and lock-nut 30. The passage 25, is formed with an air intake opening 31, which is provided with an air inlet pipe 32. The discharge passage 22, is provided with a fan-shaped exhaust duct 34, which extends to within a short distance of the edge of the deflector plate 23, and directly over the passage 25; said exhaust duct 34, is provided with an exhaust pipe 35, leading into the pipe 38 communicating with the blower 36, on the motor shaft 5, and thence into the hollow base 1. The ground coffee is delivered in the usual way into the receptacle 39.

In connection with the automatic bur releasing mechanism described in my Patent No. 1,011,243, issued December 12, 1911, there is formed in the side of the passage 22, a hinged door 40, which is operated by a lever 41, from the above referred to mechanism to swing said door 40, across said passage 22, at an angle to close the same and direct the contents of the burs into a tray 42, supported on a bracket 43, outside of said casing 8; in a normal position said door 40, is closed by a spring 44, attached thereto and to said lever.

Having thus described my invention what I claim as new and desire to secure by Letters Patent is:—

The combination in a grinding and cleaning mill, of a casing, feeding means above said casing, grinding means within the casing for coöperation with the feeding means, said casing being formed within a depending duct in one side thereof, said duct opening into the casing, an inclined deflector plate secured to the interior of the casing and extending beneath the duct, an extension formed upon the deflector plate and depending in parallel relation to the casing, said extension producing a passage, said casing having an opening in one side thereof leading into the passage, and discharge means disposed within the casing, beneath the passage.

In testimony whereof I affix my signature in presence of two witnesses.

WILLIAM C. PRITCHARD.

Witnesses:
Wm. J. Coulter,
John J. Thompson.